US012386886B2

(12) United States Patent
Dixon et al.

(10) Patent No.: US 12,386,886 B2
(45) Date of Patent: Aug. 12, 2025

(54) CONTEXTUAL TEXT LOOKUP FOR IMAGES

(71) Applicant: Apple Inc., Cupertino, CA (US)

(72) Inventors: Ryan S. Dixon, Mountain View, CA (US); Pulah J. Shah, Cupertino, CA (US); Yang Zhao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/973,500

(22) Filed: Oct. 25, 2022

(65) Prior Publication Data

US 2023/0350941 A1    Nov. 2, 2023

Related U.S. Application Data

(60) Provisional application No. 63/336,987, filed on Apr. 29, 2022.

(51) Int. Cl.
*G06F 16/583* (2019.01)
*G06F 16/538* (2019.01)

(52) U.S. Cl.
CPC ........ *G06F 16/5846* (2019.01); *G06F 16/538* (2019.01)

(58) Field of Classification Search
CPC .................... G06F 16/5846; G06F 16/538
See application file for complete search history.

(56) References Cited

U.S. PATENT DOCUMENTS

| 9,773,102 B2 * | 9/2017 | Graham | G06F 21/335 |
| 2009/0287669 A1 * | 11/2009 | Bennett | G06F 16/58 |
| | | | 707/999.005 |
| 2012/0254076 A1 * | 10/2012 | Yang | G06F 16/5866 |
| | | | 706/12 |
| 2012/0269116 A1 * | 10/2012 | Xing | G06F 16/3322 |
| | | | 707/706 |
| 2015/0033164 A1 * | 1/2015 | Jung | G06F 9/451 |
| | | | 715/765 |
| 2016/0019618 A1 * | 1/2016 | Lin | G06F 3/005 |
| | | | 705/26.61 |
| 2016/0162591 A1 * | 6/2016 | Dokania | G06F 16/955 |
| | | | 707/738 |
| 2020/0250453 A1 * | 8/2020 | Gupta | G06F 3/0482 |
| 2021/0208741 A1 * | 7/2021 | Yang | G06F 16/951 |

(Continued)

OTHER PUBLICATIONS

Daniel Carlos Guimarães Pedronette et al., "Exploiting contextual information for image re-ranking and rank aggregation", Mar. 13, 2012, Springer, pp. 115-128 (Year: 2012).*

(Continued)

*Primary Examiner* — Jared M Bibbee
(74) *Attorney, Agent, or Firm* — BAKERHOSTETLER

(57) ABSTRACT

The subject technology provides for contextual text lookup for images. When a request is received by an electronic device to perform a lookup or search for text in an image that is displayed at the electronic device, the electronic device may obtain one or more search results, based on the text itself and based on contextual information derived, by the electronic device, from the image. In one or more implementations, application information associated with an application that displays the image may also be used as contextual metadata for enhancing the results of the search for the text from the image.

20 Claims, 7 Drawing Sheets

(56) References Cited

U.S. PATENT DOCUMENTS

2022/0138404 A1* 5/2022 Baker .................. G06F 40/134
715/205
2022/0335242 A1* 10/2022 Bossard ................ G06T 11/60

OTHER PUBLICATIONS

Cooke, "How to use Google Lens (How to get it and what it can do)," Oct. 1, 2020, retrieved from https://www.youtube.com/watch?v=ymSTtysmC6l, transcript, 39 pages.

Cooke, "How to Use Google Lens," Genealogy Gems, Oct. 3, 2020, retrieved from https://lisalouisecooke.com/2020/10/03/how-to-use-google-lens.

International Search Report and Written Opinion from PCT/US2023/020280, dated Jul. 12, 2023. 12 pages.

European Office Action from European Patent Application No. 23726724.0, dated Jun. 18, 2025, 8 pages.

* cited by examiner

CONTEXTUAL TEXT LOOKUP FOR IMAGES

CROSS REFERENCE TO RELATED APPLICATIONS

This application claims the benefit of priority to U.S. Provisional Patent Application No. 63/336,987, entitled, "Contextual Text Lookup for Images", filed on Apr. 29, 2022, the disclosure of which is hereby incorporated herein in its entirety.

TECHNICAL FIELD

The present description generally relates to machine learning, including, for example, using machine learning for contextual text lookup for images.

BACKGROUND

Conventional search engines are configured to perform searches for strings of text, typically entered by a user into a browser application at an end user's device. For example, a user of an electronic device that sees a product name may open a browser application, type the product name into the browser application, and submit the typed text to a search engine for lookup via the browser application.

BRIEF DESCRIPTION OF DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices are provided that can recognize text in an image being displayed by the electronic device, and provide a user with options to select or otherwise interact with the recognized text in the image. In one or more implementations, the user may request a search for (e.g., a lookup of) some or all of the text a displayed image.

In accordance with one or more implementations, the subject technology provides improved text lookup for text identified in an image displayed by an electronic device, by using other contextual information in the image, and/or associated with the image, to enhance the search results. For example, contextual information may be derived from the image and may include other text in the image or on the screen, an object type of an object in the image or on the screen, one or more embeddings of portions of the image, application information for an application displaying the image, location information for the image and/or for the device displaying the image, or any other information that can be extracted from or derived from the image.

In accordance with various implementations, the contextual information can be used to locally rank server-provided search results at the device displaying the image, or the contextual information can be sent to a server with the selected text to enhance the search results from the server. The server-provided search results can also be displayed with locally generated dictionary results (e.g., a dictionary entry for word or words in the selected text) in one or more implementations.

Figure 1:
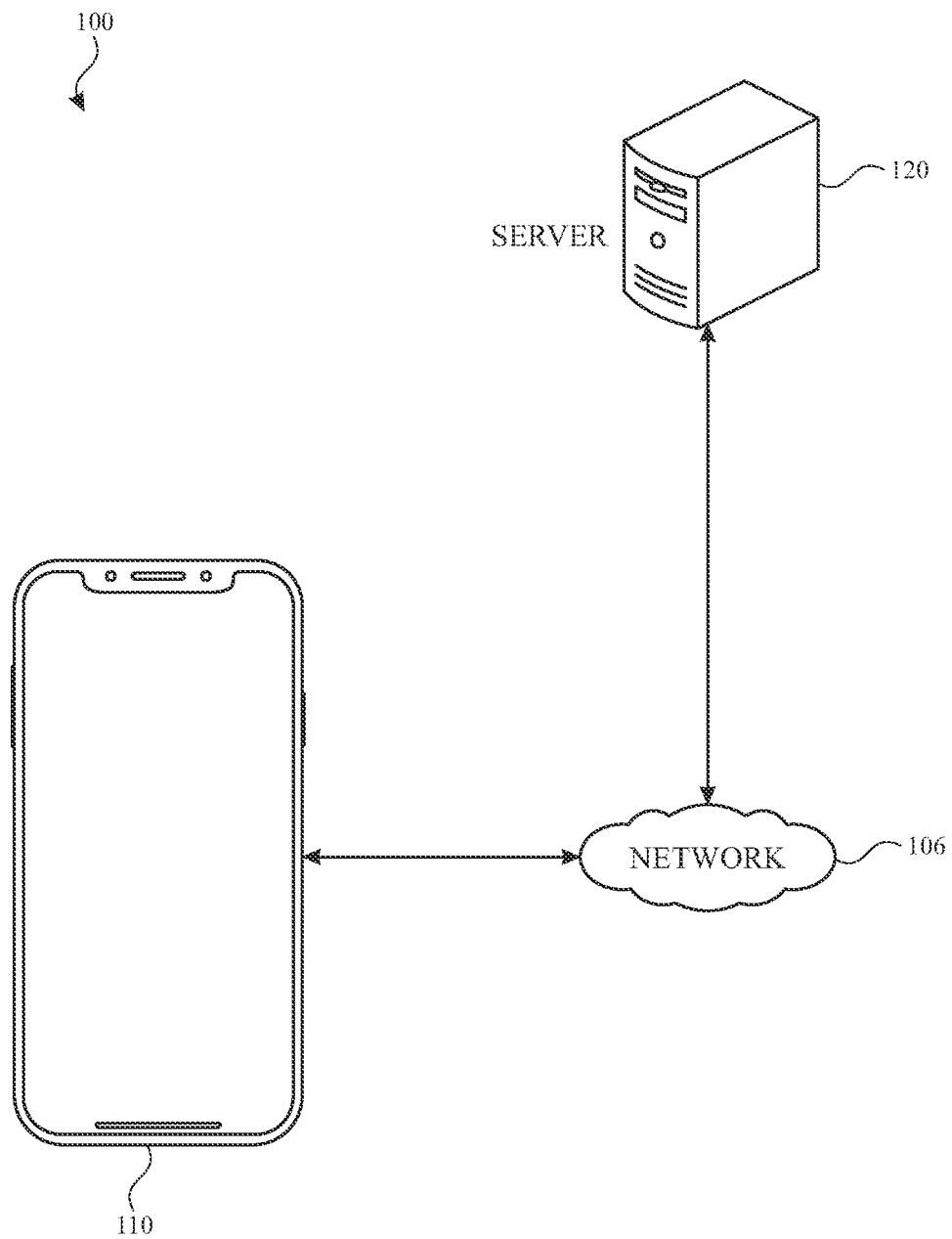
FIG. 1 illustrates an example network environment in accordance with one or more implementations of the subject technology.

FIG. 1 illustrates an example network environment 100 in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a computing device 110 (also referred herein to as an electronic device), and a server 120. The network 106 may communicatively (directly or indirectly) couple the computing device 110 and/or the server 120. In one or more implementations, the network 106 may be an interconnected network of devices that may include, or may be communicatively coupled to, the Internet. For explanatory purposes, the network environment 100 is illustrated in FIG. 1 as including the computing device 110, and the server 120; however, the network environment 100 may include any number of electronic devices and any number of servers.

The computing device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the computing device 110 is depicted as a smartphone. The computing device 110 may be, and/or may include all or part of, the systems discussed below with respect to FIG. 2 and/or FIG. 8.

In one or more implementations, the computing device 110 may provide a system for training a machine learning model using training data, where the trained machine learning model is subsequently deployed locally at the computing device 110. Further, the computing device 110 may provide one or more frameworks for training machine learning models and/or developing applications using the machine learning models. In an example, the computing device 110 may be a user device (e.g., a smartphone, a tablet device, a laptop computer, a desktop computer, a wearable electronic device, etc.) that displays an image that includes selectable and/or searchable text. In one or more implementations as described herein, the computing device 110 may communicate with a server 120 (e.g., a back-end server or a search server), such as to obtain search results (e.g., context-based search results) for text in an image displayed by the computing device 110.

In an implementation, the server 120 may train one or more machine learning models for deployment to a client electronic device (e.g., the computing device 110). In other implementations, the server 120 may provide a system for training a machine learning model using training data, where the trained machine learning model is subsequently deployed locally at the server 120. The machine learning model may be deployed on the server 120 and/or the computing device 110 may then perform one or more machine learning algorithms. In one or more implementations, the server 120 may provide a cloud service that utilizes the trained machine learning model and is continually refined over time. The server 120 may be, and/or may include all or part of, the systems discussed below with respect to FIG. 2 and/or FIG. 8.

Figure 2:
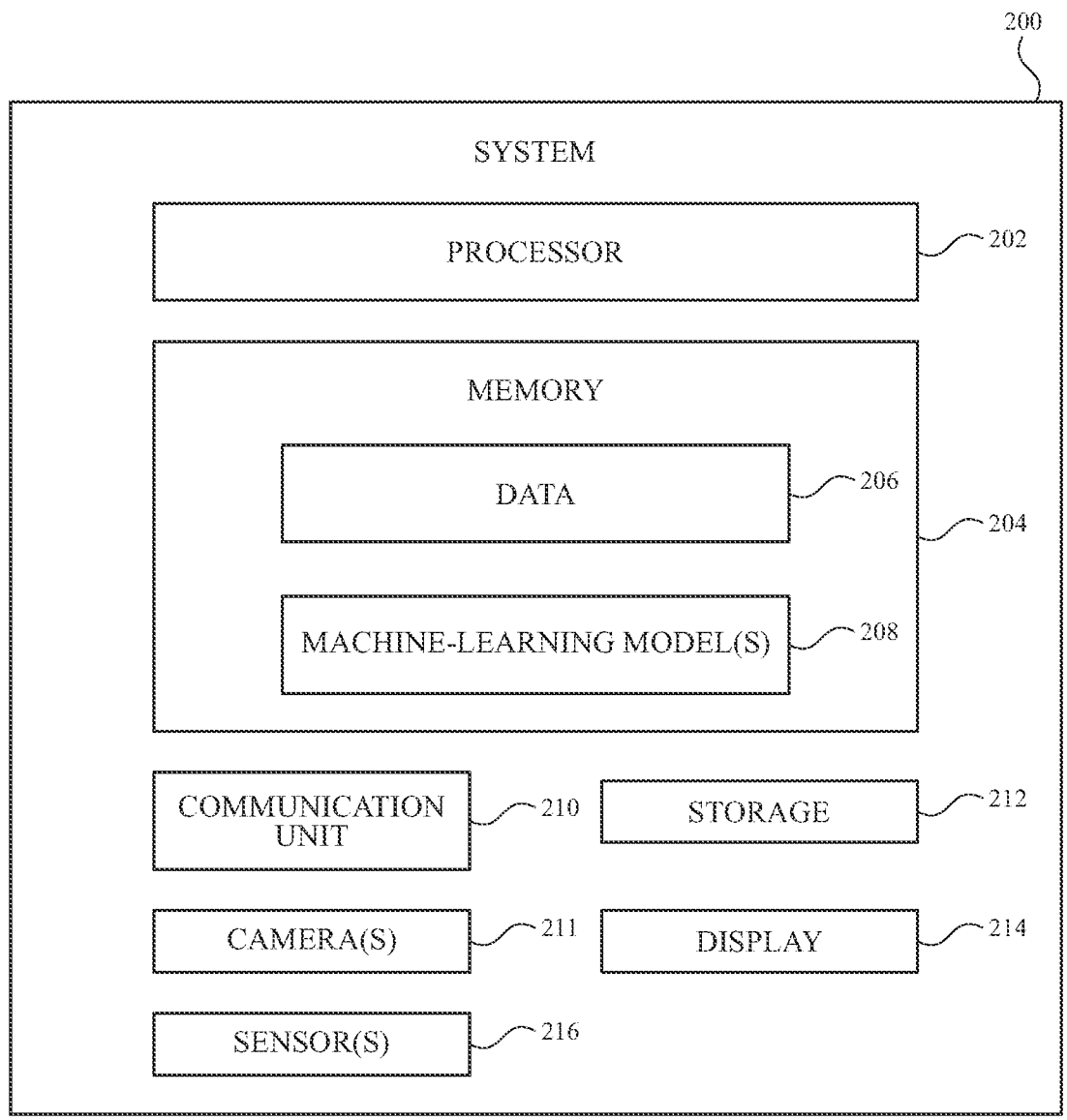
FIG. 2 illustrates an example system in accordance with one or more implementations of the subject technology.

FIG. 2 illustrates an example system 200 in accordance with one or more implementations of the subject technology. In an example, the system 200 may be implemented in computing devices, such as the computing device 110. In another example, the system 200 may be implemented either in a single device or in a distributed manner in a plurality of devices, the implementation of which would be apparent to a person skilled in the art.

In an example, the system 200 may include a processor 202, memory 204 (memory device) and a communication unit 210. The memory 204 may store data 206 and one or more machine learning models 208. In an example, the system 200 may include or may be communicatively coupled with a storage 212. Thus, the storage 212 may be either an internal storage or an external storage. In the example of FIG. 2, the system 200 includes one or more camera(s) 211, a display 214, and one or more sensors(s) 216. Camera(s) 211 may be operable to capture images, and may be mounted on front surface, a rear surface, or any other suitable location on the computing device 110 of FIG. 1. The display 214 may be operable to display images captured by the camera(s) 211 and/or received from another device or system and stored in storage 212 or in the memory 204. Displayed images may include captured still images, live preview image frames from the camera(s) 211, video frames, or any other digital images. Sensor(s) 216 may include location sensors (e.g., satellite positioning system sensors), motion sensors (e.g., inertial sensors), and/or depth sensors (e.g., stereo cameras, LIDAR sensors, radar sensors, time-of-flight sensors, or the like).

In an example, the processor 202 may be a single processing unit or multiple processing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The data 206 may represent, amongst other things, a repository of data processed, received, and generated by one or more processors such as the processor 202. One or more of the aforementioned components of the system 200 may send or receive data, for example, using one or more input/output ports and one or more communication units.

The machine learning model(s) 208, in an example, may include one or more of machine learning based models and artificial intelligence-based models, such as, for example, neural networks, or any other models and/or machine learning architectures. In an example, the machine learning model(s) 208 may be trained using training data (e.g., included in the data 206 or other data) and may be implemented by the processor 202 for performing one or more of the operations, as described herein.

In an example, the communication unit 210 may include one or more hardware units that support wired or wireless communication between the processor 202 and processors of other computing devices.

In an example, an image may be displayed by the computing device 110 implementing the system 200. The image may be stored in the storage 212, the memory 204, and/or may be received from a remote device or server. The image may be displayed in an image viewing application of the computing device 110. In another example, the image may be displayed by a browser application, a social media application, a digital media player application, that can display images. In another example, the computing device 110 may display a live preview of a field of view, as captured by a camera of the computing device 110. According to an implementation of the present subject technology, the processor 202 may be configured to obtain the image being displayed by an application running on the computing device 110. For example, the processor 202 may determine that an image is being displayed or is about to be displayed by an application running at the computing device, and may provide the image and/or a portion thereof to one or more of the machine-learning models 208.

The machine learning model(s) 208 may be trained to identify text, and/or one or more elements of interest in the image. For example, one or more of the machine-learning models may be configured to recognize text in an image displayed on the display 214. For example, one or more of the machine learning model(s) 208 may receive the image as input and then output an object type of an object in the image and/or may output one or more embeddings of portions of the image. The processor 202 may also obtain other contextual information for the image, such as application information indicating the application that is displaying the image, and/or location information for the image and/or for the computing device 110 and/or system 200.

In one or more implementations, the processor 202 (e.g., using machine learning model(s) 208) may identify the elements of interest in the image. As examples, a smart camera model may be implemented to detect any text, if present, in the image, an object detector may be implemented for identifying and/or classifying objects present in the image, and/or a gating model (also referred to herein as a coarse-classification model) may be implemented to classify the objects present in the image. In yet another example, a scene classification model may be implemented to detect and classify the overall scene depicted in the image. Thus, by implementing and/or executing the machine learning model(s) 208, the processor 202 may derive contextual information from an image, such as by determining various types of elements of interest in the image, and/or extracting features, information, and/or other signals from the image.

Figure 3:
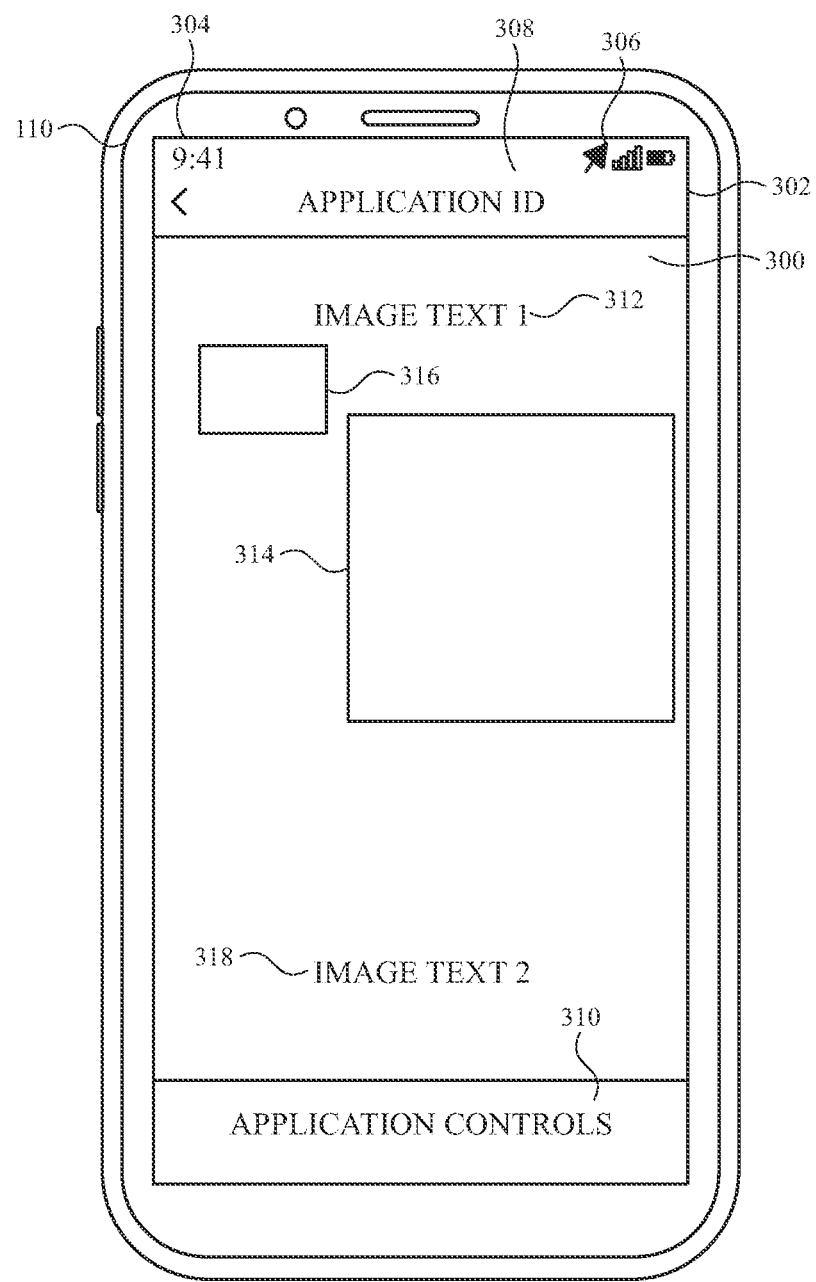
FIG. 3 illustrates an example of an electronic device displaying an image in accordance with one or more implementations of the subject technology.

FIG. 3 illustrates an example in which the computing device 110 displays an image 300. In this example, the image 300 is displayed by an application running on the computing device 110, and an application identifier (ID) 308 for the displaying application is displayed with the image on the display 302 of the computing device 110. For example, the display 302 of FIG. 3 may be an implementation of the display 214 of system 200 of FIG. 2, in one or more implementations. In the example of FIG. 3, additional information is also displayed with the image 300 on the display 302 of the computing device 110. In this example, the additional information includes application controls 310 for the application displaying the image 300, a current time 304, and a location indicator 306 (e.g., indicating the current location of the computing device 110 is known, such as based on sensor data from sensor(s) 216). For example, the application controls 310 maybe virtual buttons or other interactive features of the application that is displaying the image 300 (e.g., control buttons or interactive features for controlling a browser application, an image display application, a social media application, a camera application, a media playback application, etc.).

In the example of FIG. 3 the image 300 includes image text 312, image text 318, and objects such as a foreground object 314 and a background object 316. As discussed herein in connection with, for example, FIG. 2, the computing device 110 may identify an object type (e.g., a classification) of the objects (e.g., foreground object 314 and/or background object 316) in the image 300. The computing device 110 may also recognize the image text 312 and the image text 318, and modify the display of the image 300 to make the image text 312 and/or the image text 318 selectable and/or searchable. For example, once the computing device 110 makes the image text 312 and the image text 318 selectable, a user can tap or touch the location of the displayed text in the image 300, causing a selection tool or highlighter to surface for selection of the displayed text in the image 300. In this example, once the image text 312 and/or the image text 318 is highlighted or otherwise selected, the user can again tap or "right-click" on the selected text to surface options, such as a search or lookup option that causes the computing device 110 to obtain search results for the selected text.

As an example, in one or more implementations, a user of the computing device 110 can interact with the image 300 using a finger, a cursor, or other input mechanism to select the image text 312, and can initiate a search for the selected image text 312. In another example, the user may see the image text 312 (or otherwise be provided with information indicating the presence of the image text 312) in the displayed image 300 and use a voice input to a virtual assistant application running on the computing device 110 to request a search for the image text 312 that is included in the displayed image 300.

In one illustrative example, the image 300 may be an image of a storefront and the image 300 may include image text 312 indicating the name of the store. However, a search for only the image text indicating the name of the store may return search results that are not relevant to the store. For example, an image of a restaurant named "Butterfly" may be displayed on a user's smart phone, and the user may request a search for the text "Butterfly" displayed in the image 300. However, because "butterfly" is a term that is not generally associated with restaurants, the search results may be unrelated to the desired search results for the text from the image.

In one or more implementations, the subject technology provides improved text lookup or search for text identified in an image, by using other contextual information in the image to enhance the search results. For example, contextual information may include other text (e.g., unselected and/or unsearched text, such as the image text 318) in the image 300 or elsewhere on the display 302 (e.g., text associated with the application ID 308, and/or text associated with the application controls 310), an object type of an object (e.g., the foreground object 314 and/or the background object 316) in the image 300 or on the display 302, one or more embeddings of portions of the image 300, application information (e.g., the application identifier 308 or an application type) for an application displaying the image 300, location information for the image 300 and/or for the computing device 110, etc.

In the previous example of the image of a restaurant named "Butterfly", the computing device 110 may identify one or more objects in the image, such as plates of food, a menu, tables and chairs, doors or windows, or other objects indicative of a restaurant, may identify the relative depths of objects in the images, relative distances between objects and/or text in the image, may identify other text in the image (e.g., another word such as "restaurant", "bistro", "cafe", or the like). The computing device 110 may then initiate an enhanced search for the image text "butterfly", by including some or all of the derived the contextual information in a search request and/or in a sorting of search results obtained without the contextual information.

It is appreciated that the example in which the image 300 is an image of a storefront from a restaurant is merely illustrative. In various implementations, the image 300 may be any stored or live preview image that includes text in an image context. As another illustrative example, the image 300 may be a rendered user interface of a media playback application, the image text 312 may be a song title of a song being played back by the media playback application, the foreground object 314 may be an album cover-art image, and the image text 318 may be an artist name and/or an album title. In this example, a search for the song name may be enhanced by using contextual information derived from the image 300, such as the album title, the artist name, and/or the album art. In one or more use cases, information associated with the application displaying the image 300 may also be useful contextual information for enhancing a search for the image text 312. For example, in the example in which the image 300 includes a rendered user interface of a media playback application, a search for selected text corresponding to a song title may be enhanced by including information indicating a media playback application in the contextual information that informs the search.

This example of an image text 312 being a song title can particularly illustrate the enhancement provided by including contextual information in the text search when considering that the song title may be "Butterfly", just as the name of a restaurant can be "Butterfly". In this example, by including, in a search request and/or in a sorting or re-ranking of search results, contextual information indicating the media playback application or indicating an artist's name, an album name, an embedding of a cover art image, and/or an object type of an object displayed in the album cover art, the obtained search results can be related to the song "Butterfly", rather than a restaurant "Butterfly", or the insect "Butterfly".

In one or more implementations, depth information may also be derived from the image 300 and used as contextual information for searching for the image text 312. The depth information may be obtained using depth sensors (e.g., depth sensor(s) 216) of the computing device 110 while capturing the image 300, or may be derived from the image 300 itself (e.g., using computer vision and/or other machine learning techniques to identify the relative depths of objects in an image). As an example, depth information derived for and/or from the image 300 may be used to determine that the foreground object 314 is a foreground object and/or that the background object 316 is a background object. In one or more implementations, a foreground object and/or an object nearer to the searched image text 312 may be weighted more heavily in aiding the search for the image text 312 than a background object or object that is relatively further from the searched image text 312 in the image 300.

In accordance with various implementations, the contextual information can be used to locally rank server search results for the selected text at the computing device 110, and/or some of all of the contextual information can be sent to a server (e.g., a search server such as server 120) with the image text 312 text, to enhance the search results from the server. The server-obtained search results can also be displayed with locally generated dictionary results in one or more implementations.

Figure 4:
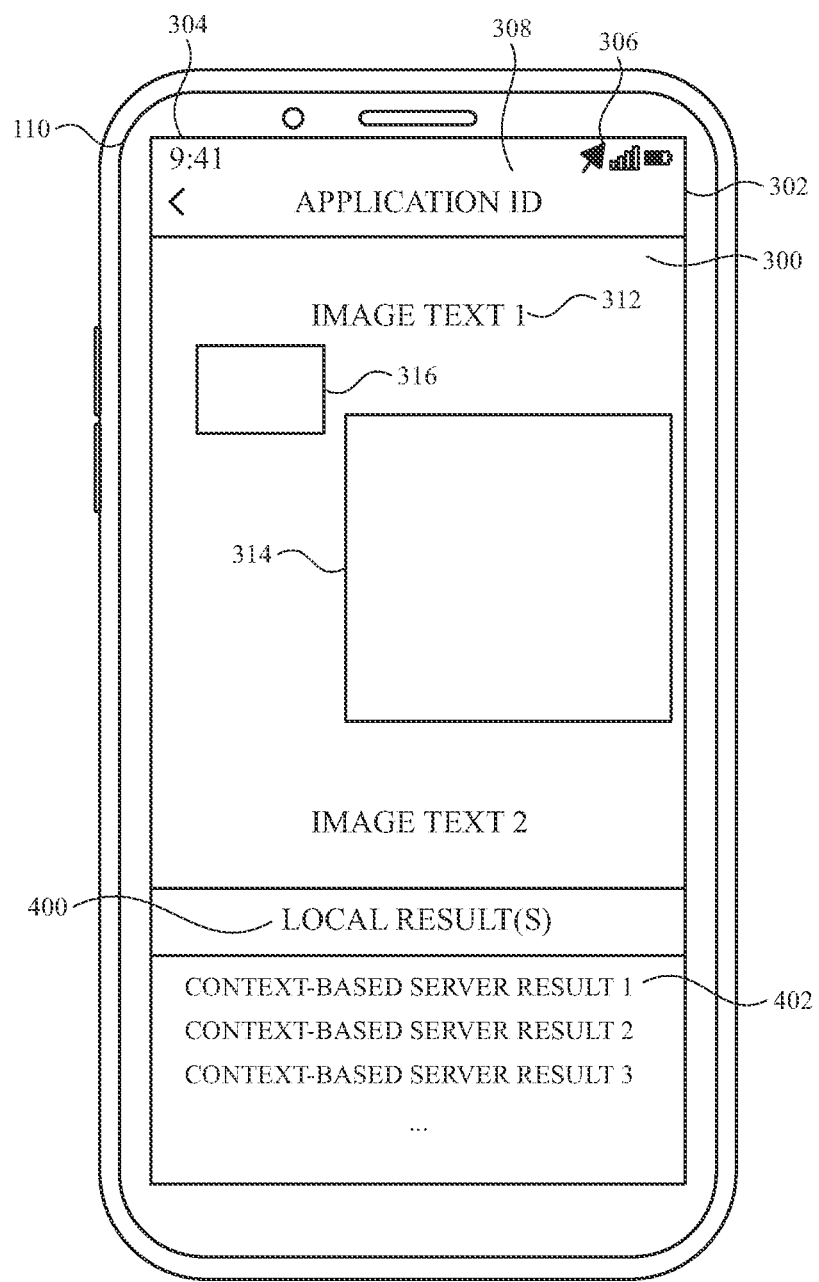
FIG. 4 illustrates an example of an electronic device displaying context-based search results for image text in accordance with one or more implementations of the subject technology.

For example, FIG. 4 illustrates an example in which search results for the image text 312 are presented by the computing device 110. In the example of FIG. 4, the search results for the image text 312 include local result(s) 400, such as locally generated dictionary results obtained by searching for the image text 312 in a local dictionary stored at the computing device 110, and obtaining a dictionary definition, a synonym, and antonym, or other dictionary entry for the image text 312 (e.g., a dictionary entry that is obtained without using contextual information). In the example of FIG. 4, the search results for the image text 312 also include context-based server results 402. As discussed in further detail herein, the context-based server results 402 may be obtained by providing the image text 312 and contextual information for the image 300 to a server, such as the server 120 of FIG. 1, and receiving search results generated based both on the image text 312 and the contextual information, or by providing only the image text 312 to the search server, receiving text-only based search results from the server, and sorting or re-ranking the text-only based search results using the contextual information (e.g., to move more relevant search results to the top of the presented list of search results).

Figure 5:
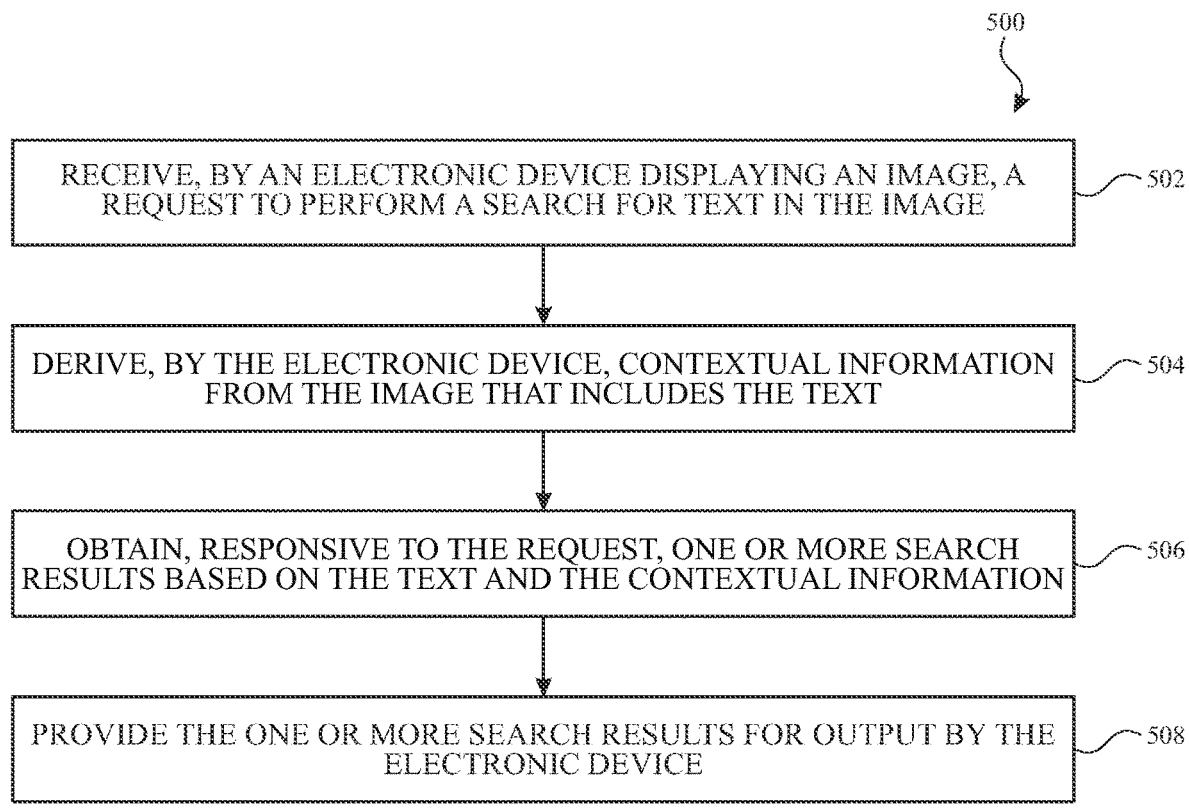
FIG. 5 illustrates a flowchart of an example process that may be performed by an electronic device for contextual text lookup for an image in accordance with one or more implementations of the subject technology.

FIG. 5 illustrates a flow diagram of an example process 500 for performing a contextual text lookup for text in an image, in accordance with one or more implementations. For explanatory purposes, the process 500 is primarily described herein with reference to the computing device 110 of FIG. 1. However, the process 500 is not limited to the computing device 110, and one or more blocks (or operations) of the process 500 may be performed by one or more other components and/or other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, an electronic device (e.g., computing device 110) that is displaying an image (e.g., image 300) may receive a request to perform a search for text (e.g., image text 312) in the image. For example, receiving the request may include receiving, by the electronic device while displaying the image, a selection of the text in the image (e.g., a user selection of the text). As another example, receiving the request may include receiving the request from a user via a voice input to the application and/or to a voice assistant application running on the device.

In one or more implementations, the image is a flat image (e.g., an array of pixel values without metadata indicating the contents of the image), and the process 500 also includes, prior to receiving the request: detecting, by the electronic device in the flat image while the flat image is displayed, the text; and modifying the display of the flat image to display the text as selectable text. In one or more implementations, the process 500 may also include obtaining the image from memory of the electronic device, from memory of a remote device, or from a camera of the electronic device, and displaying the image with the electronic device (e.g., with the display 302, as shown in the example of FIG. 3). In one or more other implementations, the electronic device may be detected the text in a flat image responsive to receiving a user interaction with the image, such as an attempt to select the text in the flat image.

At block 504, the electronic device may derive contextual information from the image that includes the text. In one or more implementations as discussed herein, deriving the contextual information may include, by the electronic device (e.g., by providing the image as input to one or more of machine learning model(s) 208), determining a label for an object (e.g., foreground object 314, background object 316, and/or any other image object) in the image. In various implementations, the contextual information may be derived from the image prior to receiving the request for the search, or responsive to receiving the request for the search.

In one or more implementations as discussed herein, deriving the contextual information may include, by the electronic device (e.g., by providing the image as input to one or more of machine learning model(s) 208), obtaining an embedding of a region of interest in the image. In one or more implementations as discussed herein, deriving the contextual information may include, by the electronic device (e.g., by providing the image as input to one or more of machine learning model(s) 208), obtaining unselected text and/or unsearched text (e.g., image text 318 or other text not interacted with by the user in connection with the search request) from the image. In one or more implementations as discussed herein, deriving the contextual information may include, by the electronic device (e.g., by providing the image as input to one or more of machine learning model(s) 208 and/or by obtaining location information from a location sensor or process at the electronic device), determining a location associated with the image (e.g., a location at which the image was captured, such as from location metadata of the image and/or by identifying location-specific information, such as a street sign, in the image). In one or more implementations as discussed herein, deriving the contextual information may include, by the electronic device (e.g., by providing the image as input to one or more of machine learning model(s) 208), obtaining depth information associated the image (e.g., from depth metadata captured using one or more depth sensors (e.g., depth sensors of sensor(s) 216) at the time the image was obtained, and/or by inferring relative depths of objects in the image from the image itself). For example, deriving the contextual information may include identifying and/or distinguishing one or more foreground objects (e.g., foreground object 314) from one or more background objects (e.g., background object 316).

At block 506, the electronic device may obtain, responsive to the request, one or more search results based on the text and the contextual information.

In one or more implementations, obtaining the one or more search results includes providing the text from the electronic device to a server (e.g., server 120), receiving a ranked set of search results from the server at the electronic device, and re-ranking the ranked set of search results based on the contextual information to generate the one or more search results for output by the electronic device. For example, the ranked set of search results may be a set of search results that is ranked and/or ordered according to a server-determined relevance to the text. However, as described herein, relevance to the text alone may not coincide with relevance to the user's desired information about the searched text from a displayed image. Accordingly, in one or more implementations, the contextual information derived from the image may be used to re-rank and/or reorder the set of search results received from the server to place search results most relevant to the searched text and one or more contextual aspects of the image at the top of the displayed/output set of search results.

In one or more implementations, obtaining the one or more search results may include providing the text and the contextual information from the electronic device to a server (e.g., the server 120), and receiving the one or more search results from the server. In these implementations, the one or more search results from the server may already be ranked and/or ordered for relevance based on the contextual information (e.g., without performing a context-based re-ranking at the electronic device). As discussed herein, in one or more implementations, the contextual information may include application information (e.g., an application identifier, such as application ID 308, application text associated with application controls, such as application controls 310, and/or any other information indicating a particular application or type of application) for an application by which the image is displayed. In these implementations, obtaining the one or more search results may include obtaining, by the electronic device, application information for an application by which the image is displayed; and obtaining the one or more search results based on the text, the contextual information, and the application information.

In one or more implementations, when a search request is received from an interface separate from the display displaying the image (e.g., via a voice input, such as if a user speaks a request to the computing device 110 to search for image text 312 while the image 300 is displayed on the display 302), the computing device 110 may determine that the requested search relates to and/or is the same as some or all of the text display in the image, and then obtain search results for the requested search using the contextual information derived from the image based on that determination.

At block 508, the electronic device may provide the one or more search results for output by the electronic device.

For example, providing the one or more search results for output may include providing the one or more search results for display by a display (e.g., display 302) of the electronic device (e.g., as described herein in connection with FIG. 4).

Figure 6:
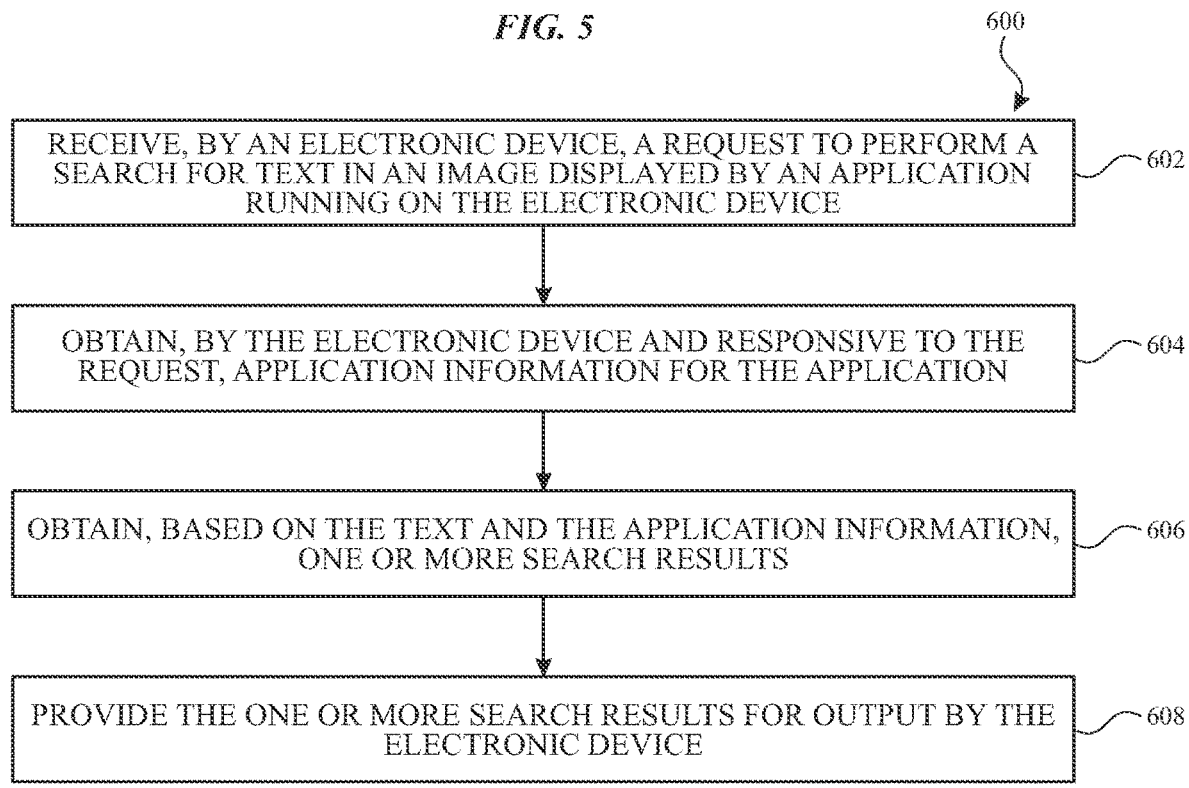
FIG. 6 illustrates a flowchart of another example process that may be performed by an electronic device for contextual text lookup for an image in accordance with one or more implementations of the subject technology.

FIG. 6 illustrates a flow diagram of another example process 600 for performing a contextual text lookup for text in an image, in accordance with one or more implementations. For explanatory purposes, the process 600 is primarily described herein with reference to the computing device 110 of FIG. 1. However, the process 600 is not limited to the computing device 110, and one or more blocks (or operations) of the process 600 may be performed by one or more other components and/or other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, an electronic device (e.g., computing device 110) may receive a request to perform a search for text (e.g., image text 312) in an image (e.g., image 300) displayed by an application running on the electronic device. For example, receiving the request may include receiving, by the electronic device while displaying the image, a selection of the text in the image (e.g., a user selection of the text). As another example, receiving the request may include receiving the request from a user via a voice input to the application and/or to a voice assistant application running on the device.

At block 604, the electronic device may obtain, responsive to the request, application information for the application. As examples, the application information may include an application identifier, such as application ID 308, application text associated with application controls, such as application controls 310, and/or any other information indicating a particular application or type of application. In one illustrative example, the application information may include an application type (e.g., media player, browser, camera, or other type). In another illustrative example, the application information includes a file type of a file accessed by the application and associated with the image (e.g., an audio file type having an associated album artwork image, or a video file type having an associated cover or poster artwork image). In various implementations, the application information may be obtained from the image prior to receiving the request for the search, or responsive to receiving the request for the search.

At block 606, the electronic device may obtain, based on the text and the application information, one or more search results. In one or more implementations, obtaining the one or more search results may also include obtaining, based on the application information, image context information for the image, and obtaining the one or more search results based on the text and the image context information. For example, an image of album art may not be identifiable as album art only from the image of the album art. However, the electronic device may determine that the image is an image of album art in part based on the media player type of the application and/or an audio file type of a file from which audio content is being played by a media player application. In one or more implementations, the search results obtained at block 606 may also be obtained based on contextual information derived from the image, using one or more of the operations described herein in connection with any of FIGS. 2-5.

In one or more implementations, obtaining the one or more search results may include providing the text from the electronic device to a server, receiving a ranked set of search results from the server at the electronic device, and re-ranking the ranked set of search results based on the application information to generate the one or more search results for output by the electronic device. In one or more other implementations, obtaining the one or more search results may include providing the text and the application information from the electronic device to a server (e.g., server 120), and receiving the one or more search results from the server (e.g., with or without performing a re-ranking of the one or more search results from the server locally at the electronic device).

At block 608, the electronic device may provide the one or more search results for output by the electronic device. For example, providing the one or more search results for output may include providing the one or more search results for display by a display (e.g., display 302) of the electronic device (e.g., as described herein in connection with FIG. 4).

Figure 7:
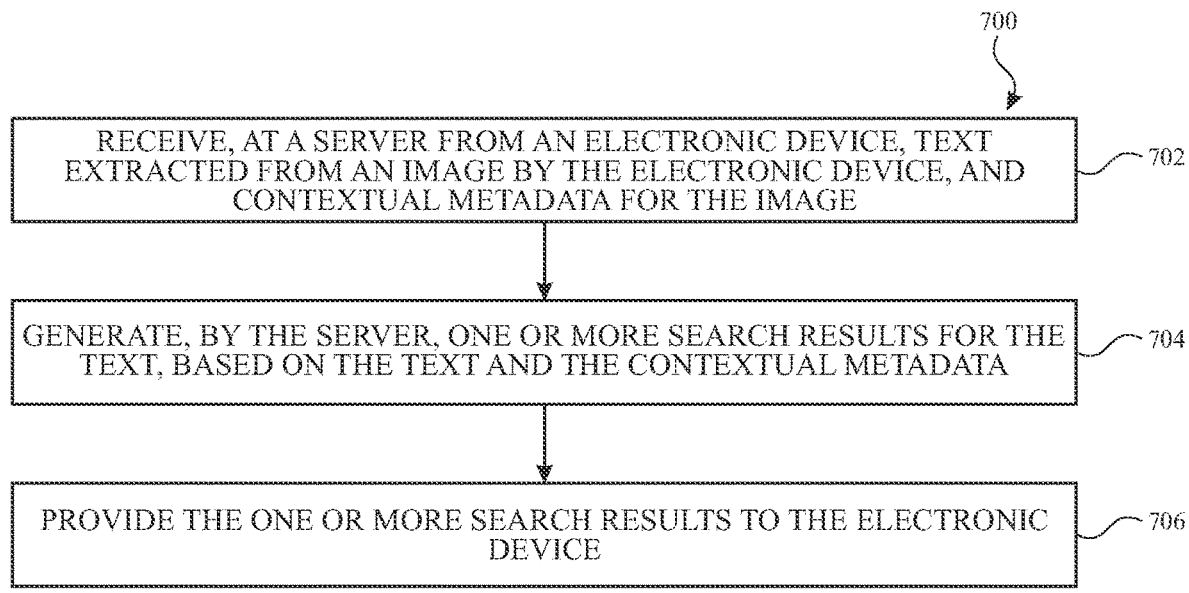
FIG. 7 illustrates a flowchart of an example process that may be performed by a server for contextual text lookup for an image in accordance with one or more implementations of the subject technology.

FIG. 7 illustrates a flow diagram of an example process 700 for performing a contextual text lookup for text in an image at a server, in accordance with one or more implementations. For explanatory purposes, the process 700 is primarily described herein with reference to the server 120 of FIG. 1. However, the process 700 is not limited to the computing server 120, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a server (e.g., server 120) may receive, from an electronic device (e.g., computing device 110), text (e.g., image text 312) extracted from an image (e.g., image 300) by the electronic device, and contextual metadata for the image. For example, receiving the text and the contextual metadata may include receiving the text and the contextual metadata from the electronic device via a network, such as the network 106 of FIG. 1 (e.g., following selection of the text within an image displayed at the electronic device). The text may have been, as examples, extracted from the image by the electronic device by, for example, identifying the text in the image, displaying the image with the text in a selectable and/or searchable state, and receiving, from a user a request to search for the text displayed in the selectable and/or searchable state.

At block 704, the server may generate one or more search results for the text based on the text and the contextual metadata. As examples, the contextual metadata may include one or more of a label for an object (e.g., foreground object 314 and/or background object 316) in the image, an embedding of a region of interest in the image, additional text (e.g., unselected text and/or unsearched text, such as image text 318) from the image, a location associated with the image, or depth information associated objects in the image. In one or more implementations, the contextual metadata may also, or alternatively, include application information for an application associated with the image at the electronic device.

In one or more implementations, generating the one or more search results includes generating a ranked set of search results based on the text, and re-ranking the ranked set of search results based on the contextual metadata to generate the one or more search results. In one or more other implementations, generating the one or more search results may include performing, by the server, a search for a combination of the text and the contextual metadata (e.g., by providing both the text and the contextual metadata as concurrent inputs to a search engine, and receiving the one or more search results as an output of the search engine).

At block 706, the server may provide the one or more search results to the electronic device. For example, providing the one or more search results may include transmitting the one or more search results to the electronic device via a network, such as the network 106 of FIG. 1.

As described above, one aspect of the present technology is the gathering and use of data available from specific and legitimate sources for contextual lookup for images. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for contextual lookup for images. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of contextual lookup for images, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
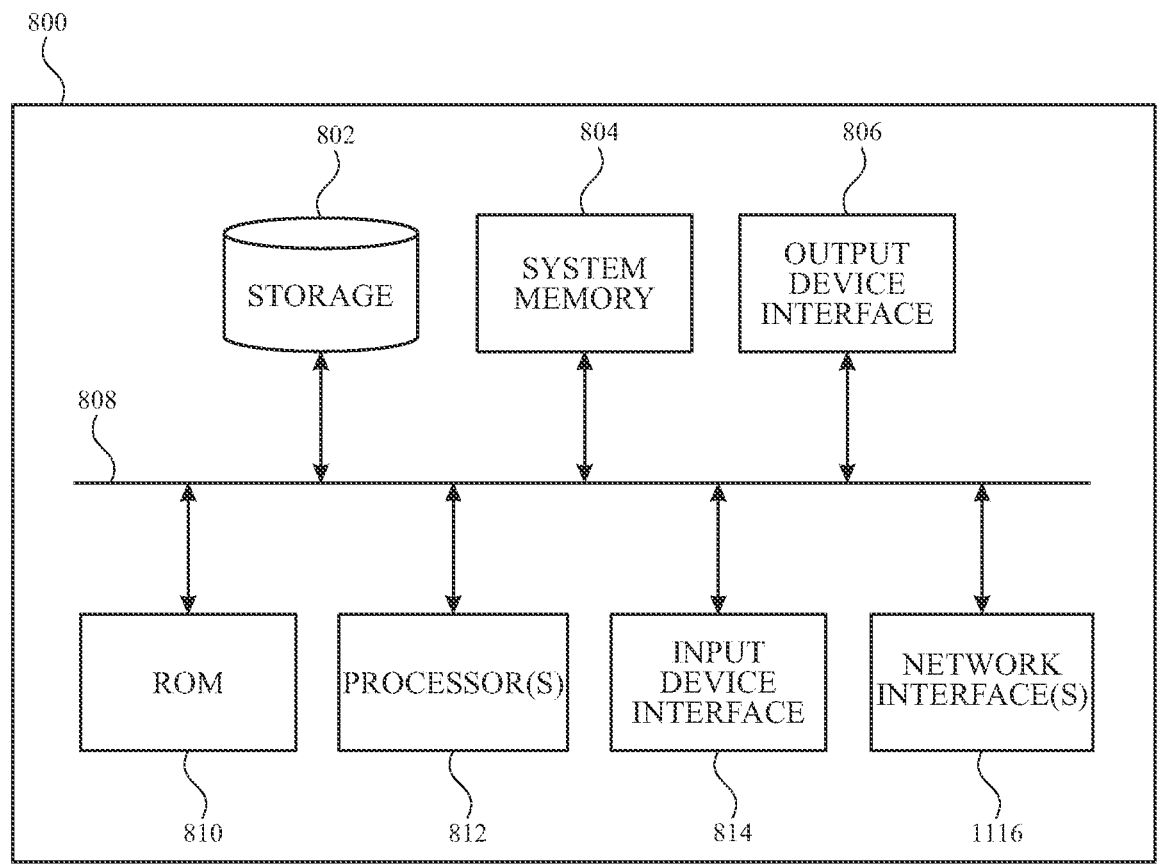
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the computing device 110 and/or the server 120 shown in FIG. 1, and/or the system 200 of FIG. 2. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 120 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by an electronic device, from an application displaying an image having text therein in a selectable or searchable state, a request to perform a search for text in the image;
   deriving, by the electronic device, contextual information from the image that includes the text;
   obtaining, responsive to the request, by the electronic device and from a server, one or more ranked search results based on the text;
   re-ranking, by the electronic device, the one or more ranked search results based in part on at least the contextual information derived from the image and an application information provided by the application; and
   providing the one or more re-ranked search results for output by the application.

2. The method of claim 1, wherein receiving the request comprises receiving, by the electronic device while displaying the image, a selection of the text in the image.

3. The method of claim 1, wherein obtaining the one or more ranked search results comprises:
   providing the text from the electronic device to the server.

4. The method of claim 1, wherein deriving the contextual information comprises, by the electronic device, at least one of:
   determining a label for an object in the image;
   obtaining an embedding of a region of interest in the image;
   obtaining unselected text from the image;
   determining a location associated with the image; or
   obtaining depth information associated the image.

5. The method of claim 1, further comprising:
   obtaining the image from memory of the electronic device, from memory of a remote device, or from a camera of the electronic device.

6. The method of claim 1, further comprising:
   obtaining the one or more ranked search results based on the text, the contextual information, and the application information.

7. The method of claim 1, wherein the application information provided by the application comprises at least one of an application identifier, an application text associated with application controls, a type of application, a file type of a file accessed by the application, a file type associated with the image.

8. A device comprising:
   a display;
   at least one processor; and
   a memory including instructions that, when executed by the at least one processor, cause the at least one processor to:
     receive, from an application after displaying on the display an image having text therein in a selectable or searchable state, a request to perform a search for text in the image;
     derive contextual information from the image that includes the text;
     obtain responsive to the request, from a server, one or more ranked search results based on the text;
     re-rank the one or more ranked search results based in part on at least the contextual information derived from the image and an application information provided by the application; and
     provide the one or more re-ranked search results for output by the application.

9. The device of claim 8, wherein receiving the request comprises receiving, while displaying the image, a selection of the text in the image.

10. The device of claim 8, wherein obtaining the one or more ranked search results comprises:
    providing the text to the server.

11. The device of claim 8, wherein deriving the contextual information comprises at least one of:
    determining a label for an object in the image;
    obtaining an embedding of a region of interest in the image;
    obtaining unselected text from the image;
    determining a location associated with the image; or
    obtaining depth information associated the image.

12. The device of claim 8, further comprising:
    obtaining the image from the memory, from a memory of a remote device, or from a camera of the device.

13. The device of claim 8, wherein obtaining the one or more ranked search results comprises:
    providing the text and the contextual information to a server; and
    receiving the one or more ranked search results from the server.

14. The device of claim 8, further comprising:
    obtaining the one or more ranked search results based on the text, the contextual information, and the application information.

15. A non-transitory computer-readable medium comprising instructions, which when executed by at least one computing device, cause the at least one computing device to perform operations comprising:
    receiving, after displaying by an application on the computing device an image having text therein in a selectable or searchable state, a request to perform a search for text in the image;
    deriving contextual information from the image that includes the text;
    obtaining responsive to the request, from a server, one or more ranked search results based on the text;
    re-ranking the one or more ranked search results based in part on at least the contextual information derived from the image and an application information provided by the application; and providing the one or more re-ranked search results for output by the application.

16. The non-transitory computer-readable medium of claim 15, wherein receiving the request comprises receiving, while displaying the image, a selection of the text in the image.

17. The non-transitory computer-readable medium of claim 15, wherein deriving the contextual information comprises at least one of:
- determining a label for an object in the image;
- obtaining an embedding of a region of interest in the image;
- obtaining unselected text from the image;
- determining a location associated with the image; or
- obtaining depth information associated the image.

18. The non-transitory computer-readable medium of claim 15, further comprising:
- obtaining the image from the computer-readable medium, from a memory of a remote device, or from a camera of the computing device.

19. The non-transitory computer-readable medium of claim 15, wherein obtaining the one or more ranked search results comprises:
- providing the text and the contextual information to a server; and
- receiving the one or more ranked search results from the server.

20. The non-transitory computer-readable medium of claim 15, further comprising:
- obtaining the one or more ranked search results based on the text, the contextual information, and the application information.

* * * * *